US008326515B2

(12) United States Patent
Bolander et al.

(10) Patent No.: US 8,326,515 B2

(45) Date of Patent: Dec. 4, 2012

(54) DRIVER SELECTABLE AFM/NVH TOLERANCE

(75) Inventors: Thomas E. Bolander, Flint, MI (US); William C. Albertson, Clinton Township, MI (US)

(73) Assignee: GM Global Technology Operations LLC

(*) Notice: Subject to any disclaimer, the term of this patent is extended or adjusted under 35 U.S.C. 154(b) by 738 days.

(21) Appl. No.: 12/508,764

(22) Filed: Jul. 24, 2009

(65) Prior Publication Data

US 2010/0268435 A1 Oct. 21, 2010

Related U.S. Application Data

(60) Provisional application No. 61/169,524, filed on Apr. 15, 2009.

(51) Int. Cl.
*G06F 19/00* (2006.01)

(52) U.S. Cl. .................. 701/102; 701/104; 123/198 DB

(58) Field of Classification Search .................... 701/95, 701/96, 99, 102–105, 112, 114; 123/198 F, 123/325, 332, 480, 481, 198 DB
See application file for complete search history.

(56) References Cited

U.S. PATENT DOCUMENTS

| | | | | |
|---|---|---|---|---|
| 7,493,206 | B2 * | 2/2009 | Lahti et al. | 701/103 |
| 7,739,023 | B2 * | 6/2010 | Lee | 701/96 |
| 2005/0003925 | A1 * | 1/2005 | Wakashiro et al. | 477/2 |
| 2005/0003926 | A1 * | 1/2005 | Hanada et al. | 477/3 |
| 2005/0049108 | A1 * | 3/2005 | Nishizawa et al. | 477/37 |
| 2006/0175103 | A1 * | 8/2006 | Iida et al. | 180/65.4 |
| 2006/0229158 | A1 * | 10/2006 | Ichihara | 477/185 |
| 2007/0049459 | A1 * | 3/2007 | Lewis | 477/109 |
| 2007/0068486 | A1 * | 3/2007 | Rozario et al. | 123/306 |
| 2008/0183373 | A1 * | 7/2008 | McDonald et al. | 701/111 |
| 2009/0118969 | A1 * | 5/2009 | Heap et al. | 701/102 |

* cited by examiner

*Primary Examiner* — John Kwon
*Assistant Examiner* — Johnny Hoang

(57) ABSTRACT

An engine control system includes a coefficient calculation module that selects one of N coefficients based on an AFM selection by a corresponding one of N users. A switching torque calculation module calculates an adjusted active fuel management (AFM) switching threshold based on the one of the N coefficients, a maximum torque of an engine, and a default AFM switching threshold.

14 Claims, 4 Drawing Sheets

DRIVER SELECTABLE AFM/NVH TOLERANCE

CROSS-REFERENCE TO RELATED APPLICATIONS

This application claims the benefit of U.S. Provisional Application No. 61/169,524, filed on Apr. 15, 2009. The disclosure of the above application is incorporated herein by reference.

FIELD

The present disclosure relates to active fuel management.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines may include engine control systems that deactivate cylinders under low load situations. For example, an eight cylinder engine can be operated using four cylinders to improve fuel economy by reducing pumping losses. This process is generally referred to as active fuel management (AFM). Operation using all of the engine cylinders is referred to as an "activated" mode (AFM disabled). A "deactivated" mode (AFM enabled) refers to operation using less than all of the cylinders of the engine (i.e. one or more cylinders not active). In the deactivated mode, there are fewer cylinders operating. Engine efficiency is increased as a result of less engine pumping loss and higher combustion efficiency.

SUMMARY

An engine control system includes a coefficient calculation module that selects one of N coefficients based on an AFM selection by a corresponding one of N users. A switching torque calculation module calculates an adjusted active fuel management (AFM) switching threshold based on the one of the N coefficients, a maximum torque of an engine, and a default AFM switching threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
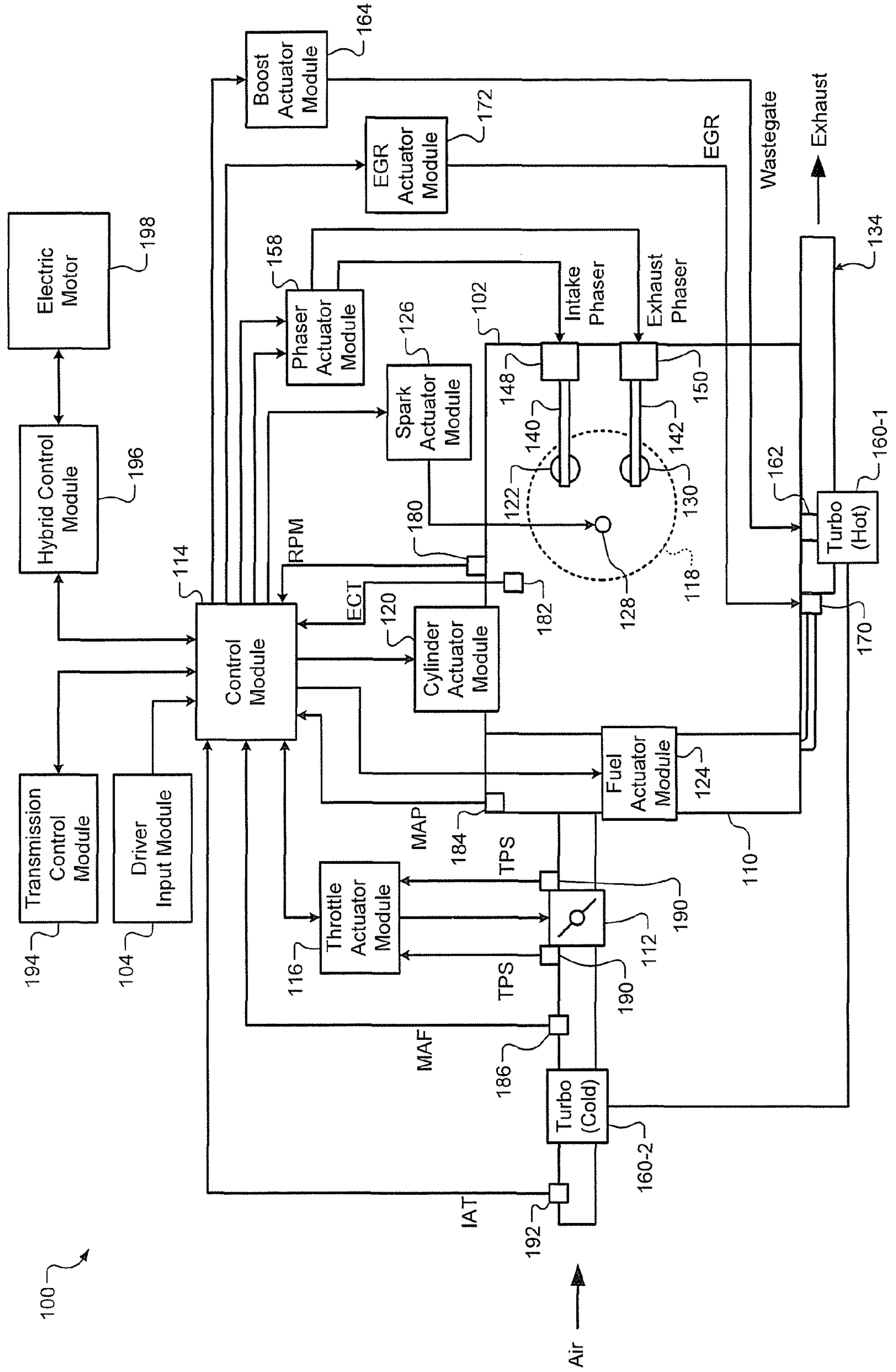
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An internal combustion engine may include an engine control system that deactivates cylinders under low load situations. The engine control system may determine that low load conditions exist when the internal combustion engine produces a predetermined percentage of a maximum torque. In the present disclosure, the predetermined percentage may be adjusted by a user. The user may increase or decrease the predetermined percentage to control the deactivation of cylinders.

Referring now to FIG. 1, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. For example only, the throttle valve 112 may include a butterfly valve having a rotatable blade. A control module 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The control module 114 may instruct a cylinder actuator module 120 to selectively deactivate some of the cylinders, which may improve fuel economy under certain engine operating conditions.

Air from the intake manifold 110 is drawn into the cylinder 118 through an intake valve 122. The control module 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the control module 114, a spark actuator module

126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the control module 114. When implemented, variable valve lift may also be controlled by the phaser actuator module 158.

The engine system 100 may include a boost device that provides pressurized air to the intake manifold 110. For example, FIG. 1 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110.

A wastegate 162 may allow exhaust gas to bypass the turbocharger 160, thereby reducing the boost (the amount of intake air compression) of the turbocharger 160. The control module 114 controls the turbocharger 160 via a boost actuator module 164. The boost actuator module 164 may modulate the boost of the turbocharger 160 by controlling the position of the wastegate 162. In various implementations, multiple turbochargers may be controlled by the boost actuator module 164. The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The control module 114 may use signals from the sensors to make control decisions for the engine system 100.

The control module 114 may communicate with a transmission control module 194 to coordinate shifting gears in a transmission (not shown). For example, the control module 114 may reduce engine torque during a gear shift. The control module 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the control module 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The control module 114 may control actuator values in order to generate a desired torque from the engine 102.

The control module 114 may determine when to activate or deactivate cylinders based on active fuel management (AFM) switching thresholds. The AFM switching thresholds may be predetermined. The AFM switching thresholds may also be adjusted by a user. If the user does not adjust the AFM switching thresholds, then the predetermined AFM switching thresholds may be used to determine when to activate or deactivate cylinders.

Figure 2:
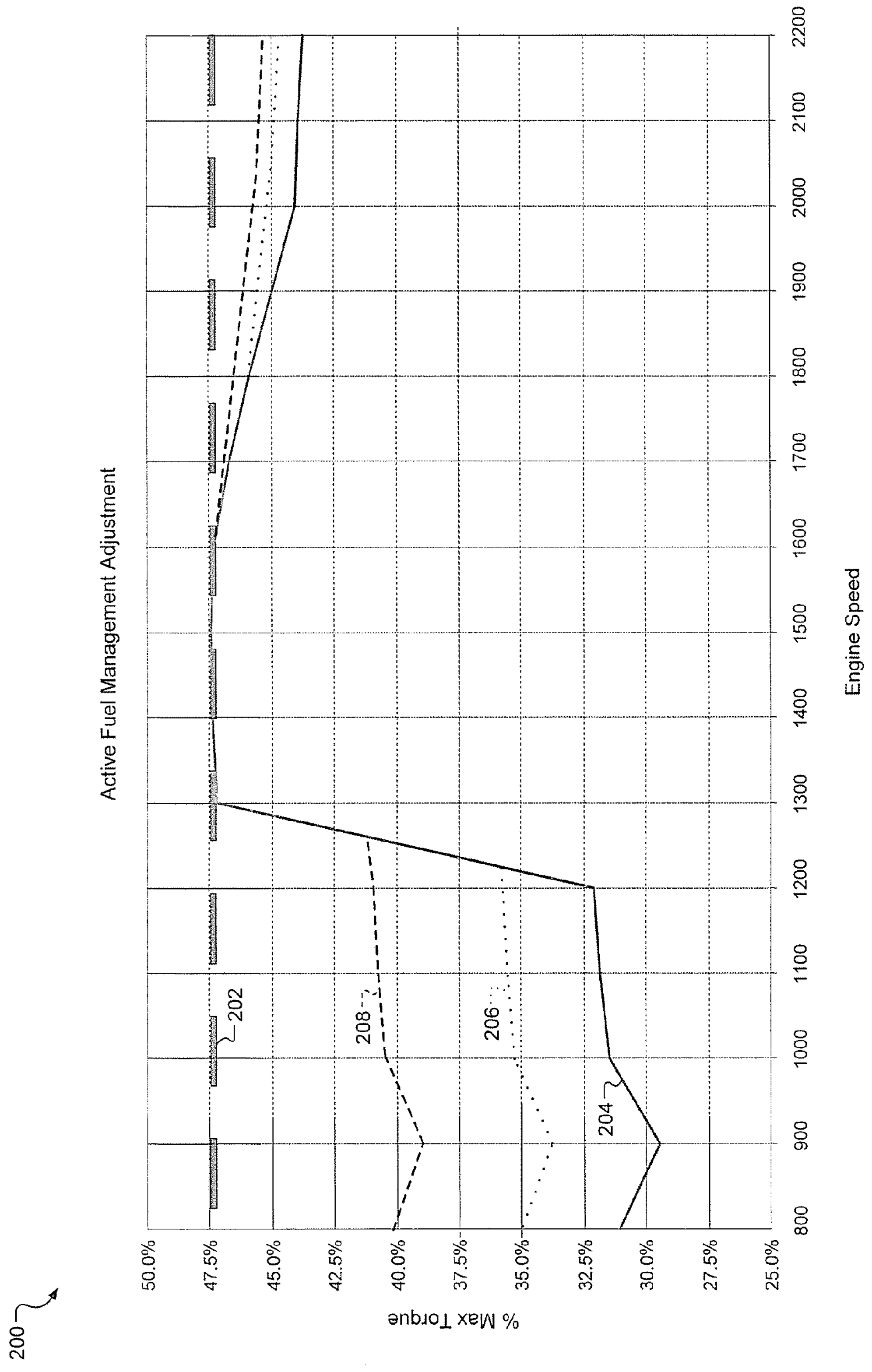
FIG. 2 is a graphical depiction of exemplary active fuel management switching thresholds according to the principles of the present disclosure.

Referring now to FIG. 2, a graphical depiction of exemplary AFM switching thresholds 200 according to the principles of the present disclosure is shown. A desired AFM curve 202 represents desired AFM switching thresholds. For example, the desired AFM switching thresholds may be approximately 50% of a maximum torque that the engine 102 can produce. A default AFM curve 204 represents AFM switching thresholds that may be used as a predetermined default for AFM.

The default AFM curve 204 may be less than the desired AFM curve 202. For example, in FIG. 2 the default AFM curve 204 is less than the desired AFM curve 202 when the speed of the engine 102 is between 800 RPM and 1300 RPM. The default AFM curve 204 is less than the desired AFM curve 202 when the speed of the engine 102 is between 1600 RPM and 2200 RPM.

The default AFM curve 204 may be less than the desired AFM curve 202 for noise, vibration, and harshness purposes. The default AFM curve 204 may be based on a perceived noise tolerance of a user. The user may have a different tolerance level than the perceived noise tolerance. The user may adjust the default AFM curve 204 to a $1^{st}$ adjusted AFM curve 206.

The $1^{st}$ adjusted AFM curve 206 may be greater than the default AFM curve 204. For example, the $1^{st}$ adjusted AFM curve 206 may be greater than the default AFM curve 204 when the speed of the engine 102 is between 800 RPM and 1300 RPM. The $1^{st}$ adjusted AFM curve 206 may be greater than the default AFM curve 204 when the speed of the engine 102 is between 1600 RPM and 2200 RPM.

By increasing the AFM switching thresholds from the default AFM curve 204 to the $1^{st}$ adjusted AFM curve 206, the deactivated mode may start at a greater percentage of maximum torque. For example only, the deactivated mode may start when the maximum torque is at 35% rather than 31%. The user may adjust the default AFM curve 204 to a level greater than the $1^{st}$ adjusted AFM curve 206. For example, the user may adjust the default AFM curve 204 to a $2^{nd}$ adjusted AFM curve 208. The $2^{nd}$ adjusted AFM curve 208 may be greater than the $1^{st}$ adjusted AFM curve 206. The default AFM curve 204 may be adjusted to any level less than or equal to the desired AFM curve 202.

Figure 3:
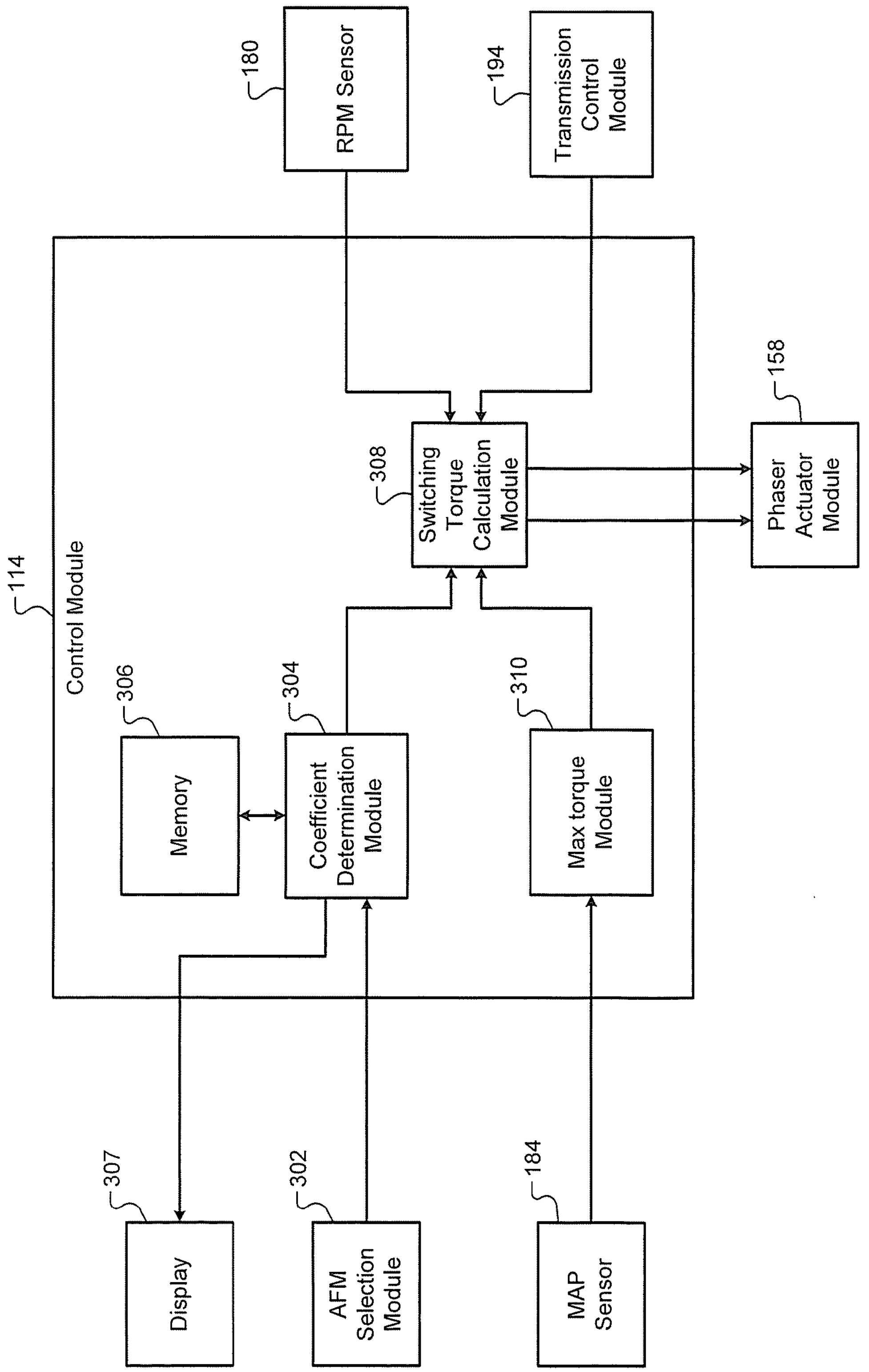
FIG. 3 is a functional block diagram of an exemplary control module according to the principles of the present disclosure.

Referring now to FIG. 3, a functional block diagram of an exemplary engine control system according to the principles of the present disclosure is shown. The user may select an AFM preference using an AFM selection module 302. The AFM selection module 302 may include a knob, dial, touch screen, paddle, or button. Multiple users may use the AFM selection module 302. Each user may select a different AFM preference.

The AFM selection module 302 outputs the AFM preference to a coefficient determination module 304. The coefficient determination module 304 determines a coefficient based on the user's AFM preference. The coefficient determination module 304 outputs the coefficient to memory 306 for storage. The memory 306 may store the coefficient for each user.

A display 307 may display the coefficient to the user. The display 307 may show one of a last known coefficient, a default coefficient, and a current coefficient. The last known coefficient is the value that is stored in memory 306 for the user. The default coefficient is a default value that is used if no value is stored in memory for the user. The current coefficient is the value obtained based on user selection via the AFM selection module 302.

The coefficient determination module 304 may output the coefficient to a switching torque calculation module 308. The switching torque calculation module 308 determines the AFM switching thresholds based on the speed of the engine 102, a transmission gear, the percentage of maximum torque, and a lookup table. The switching torque calculation module 308 may receive the speed of the engine 102 from the RPM sensor 180 and the transmission gear from the transmission control module 194.

A maximum torque module 310 calculates the percentage of maximum torque based on the MAP. The maximum torque module 310 may receive the MAP from the MAP sensor 184. The default AFM switching thresholds may be determined based on the lookup table. The switching torque calculation module 308 may calculate the adjusted AFM switching threshold based on the default AFM switching threshold, the percentage of maximum torque, and the coefficient.

The adjusted AFM switching threshold may be calculated according to: $A=T+[C\times(M-T)]$, where A is the adjusted AFM switching threshold, T is the default AFM switching threshold, M is the percentage of maximum torque, and C is the coefficient. The phaser actuator module 158 may control the intake phaser 150 and the exhaust phaser 152 based on the adjusted AFM switching threshold.

The phaser actuator module 158 may continue controlling the intake phaser 150 and the exhaust phaser 152 based on the adjusted AFM switching threshold until the engine system 100 is powered down. When the engine system 100 is powered down, the coefficient is stored in memory 306 and becomes the last known coefficient for the user.

Figure 4:
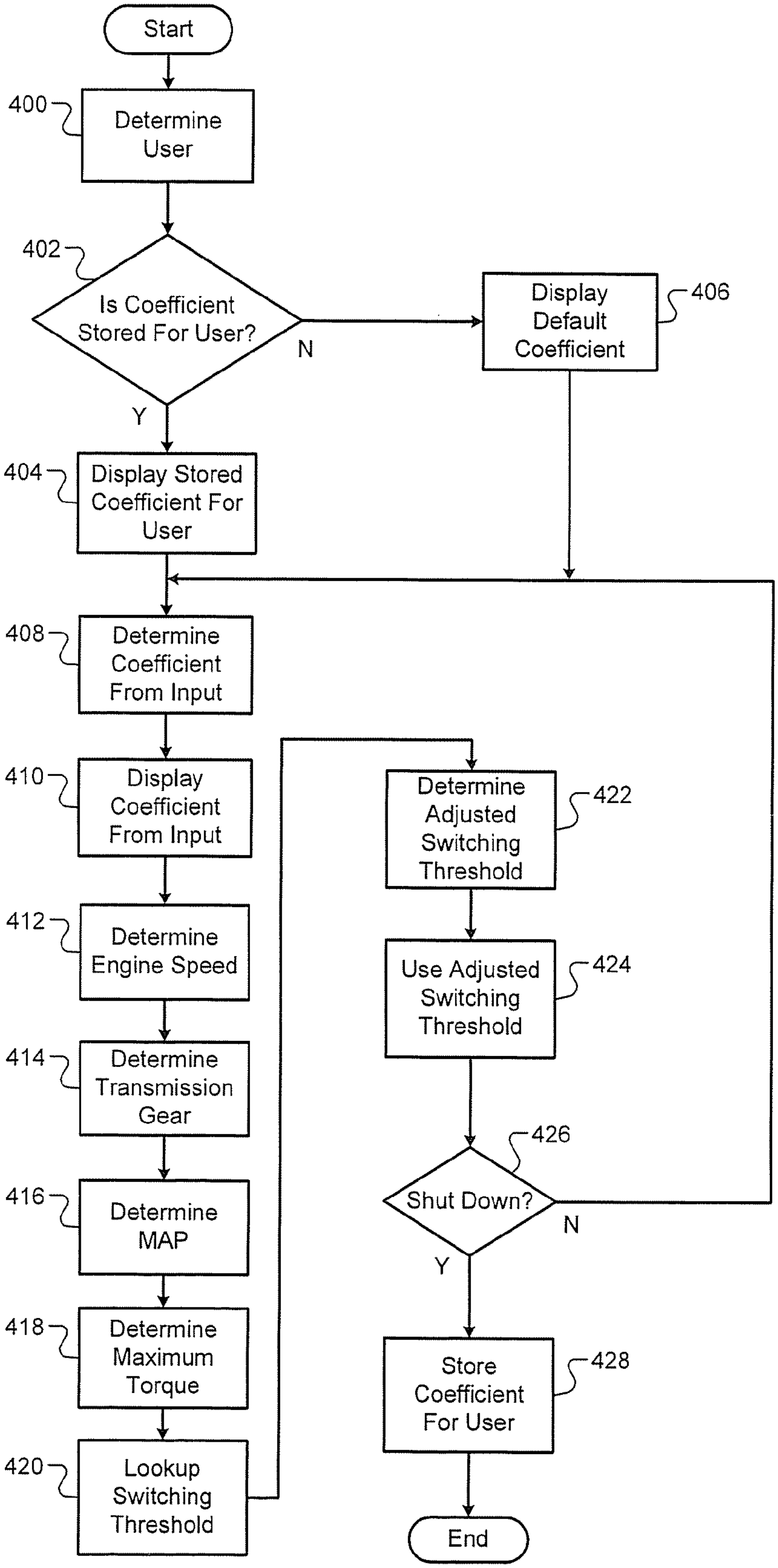
FIG. 4 is a flowchart that depicts exemplary steps performed in an AFM adjustment method according to the principles of the present disclosure.

Referring now to FIG. 4, a flowchart depicting exemplary steps in an active fuel management adjustment method is shown. Control begins in step 400, where control determines which user is operating the vehicle. For example, the user may be associated with a profile that may be selected to determine which user is operating the vehicle. In step 402, control determines whether a coefficient is stored for the user. If a coefficient is stored for the user, then control transfers to step 404; otherwise, control transfers to step 406.

In step 404, control displays the stored coefficient. In step 406, control displays the default coefficient. In step 408, control determines the coefficient from the driver input. In step 410, control displays the coefficient from the driver input. In step 412, control determines the speed of the engine. In step 414, control determines the transmission gear.

In step 416, control determines the MAP. In step 418, control determines the maximum torque. In step 420, control looks up the default switching threshold. In step 422, control calculates the adjusted AFM switching threshold. In step 424, control uses the adjusted AFM switching threshold. In step 426, control determines whether the engine system is shut down. If the engine system is shut down, then control continues in step 428; otherwise, control returns to step 408.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system for a vehicle, the engine control system comprising:

a coefficient determination module that stores N coefficients, each corresponding to a respective active fuel management (AFM) selection by a different one of N users, determines which of said N users is operating said vehicle, and selects one of said N coefficients based on said determination, wherein N is an integer greater than one; and a switching torque calculation module that calculates an adjusted AFM switching threshold based on said one of said N coefficients, a maximum torque of an engine, and a default AFM switching threshold.

2. The engine control system of claim 1 wherein said adjusted AFM switching threshold is determined according to:

$$A=T+[C\times(M-T)],$$

where A is said adjusted AFM switching threshold, T is said default AFM switching threshold, C is said one of said N coefficients, and M is a percentage of said maximum torque.

3. The engine control system of claim 1 further comprising memory that stores said N coefficients.

4. The engine control system of claim 1 wherein said one of said N coefficients is presented on a display.

5. The engine control system of claim 1 wherein said default AFM switching threshold is based on a transmission gear and an engine speed.

6. The engine control system of claim 1 further comprising an AFM selection module that determines said AFM selection by said different ones of said N users based on a user input.

7. The engine control system of claim 6 wherein said user input includes at least one of a button, a touch screen, a paddle, a dial, and knob.

8. An engine control method for a vehicle, the method comprising:

storing N coefficients, each corresponding to a respective active fuel management (AFM) selection by a different one of N users;

determining which of said N users is operating said vehicle;

selecting one of said N coefficients based on said determination, wherein N is an integer greater than one; and calculating an adjusted AFM switching threshold based on said one of said N coefficients, a maximum torque of an engine, and a default AFM switching threshold.

9. The method of claim 8 wherein said adjusted AFM switching threshold is determined according to:

$$A=T+[C\times(M-T)],$$

where A is said adjusted AFM switching threshold, T is said default AFM switching threshold, C is said one of said N coefficients, and M is a percentage of said maximum torque.

10. The method of claim 8 further comprising storing said N coefficients in memory.

11. The method of claim 8 further comprising displaying said one of said N coefficients to a user.

12. The method of claim 8 wherein said default AFM switching threshold is based on a transmission gear and an engine speed.

13. The method of claim 8 further comprising selecting said respective AFM selection based on a user input.

14. The method of claim 13 wherein said user input includes at least one of a button, a touch screen, a paddle, a dial, and knob.

* * * * *